United States Patent [19]
Williams et al.

[11] Patent Number: 5,455,496
[45] Date of Patent: Oct. 3, 1995

[54] HEAD-RETRACT CIRCUIT FOR MOVING MEDIA STORAGE APPARATUS

[75] Inventors: Richard K. Williams, Cupertino; Allen A. Chang, Milpitas; Barry J. Concklin, San Jose, all of Calif.

[73] Assignee: Siliconix Incorporated, Santa Clara, Calif.

[21] Appl. No.: 62,968

[22] Filed: May 14, 1993

[51] Int. Cl.⁶ .............................. G11B 5/54; G11B 21/02; G05B 9/02
[52] U.S. Cl. .............................. 318/563; 360/75
[58] Field of Search .............................. 318/560, 563, 318/565, 566, 254, 293, 434, 441; 360/75, 105; 363/17, 98, 132; 307/571

[56] References Cited

U.S. PATENT DOCUMENTS

| | | | |
|---|---|---|---|
| 4,237,501 | 12/1980 | Barmache et al. | 360/75 |
| 4,271,438 | 6/1981 | Cornell . | |
| 4,409,527 | 10/1983 | Sommeria . | |
| 4,679,102 | 7/1987 | Wevers et al. | 360/75 |
| 4,710,686 | 12/1987 | Guzik | 318/293 |
| 4,760,324 | 7/1988 | Underhill . | |
| 4,812,961 | 3/1989 | Essaff et al. . | |
| 4,829,415 | 5/1989 | Haferl . | |
| 4,901,216 | 2/1990 | Small . | |
| 4,926,354 | 5/1990 | Pattantyus . | |
| 4,945,467 | 7/1990 | Bhagwat . | |
| 4,999,728 | 3/1991 | Curl | 361/33 |
| 5,010,293 | 4/1991 | Ellersick | 323/278 |
| 5,019,719 | 5/1991 | King . | |
| 5,073,837 | 12/1991 | Back | 361/92 |
| 5,119,000 | 6/1992 | Schultz . | |
| 5,157,592 | 10/1992 | Walters . | |
| 5,262,704 | 11/1993 | Farr . | |
| 5,303,101 | 4/1994 | Hatch et al. | 360/105 |
| 5,325,030 | 6/1994 | Yamamura et al. | 318/563 |

*Primary Examiner*—Bentsu Ro
*Attorney, Agent, or Firm*—Skjerven, Morrill, MacPherson, Franklin, & Friel; David E. Steuber; Patrick T. Bever

[57] ABSTRACT

A moving media storage apparatus including a head actuator driven by flyback emf generated by a spindle motor. The spindle motor is driven by $V_{BAT}$, whereas the head actuator includes a head-control circuit and an H-bridge MOSFET construction which is driven by $V_{BAT}$ or $V_{CC}$ during normal operation, and a head-retract circuit which is driven by $V_{AUX}$ after a battery failure. A pair of bipolar transistors are provided in the head actuator for increasing the amount of time $V_{AUX}$ is available to drive a head-retract procedure.

19 Claims, 7 Drawing Sheets

HEAD-RETRACT CIRCUIT FOR MOVING MEDIA STORAGE APPARATUS

RELATED APPLICATIONS

This application is related to the following commonly owned and contemporaneously filed applications, all of which are incorporated herein by reference: application Ser. No. 08/062,504, now U.S. Pat. No. 5,377,094 issued on Dec. 27, 1994; application Ser. No. 08/062,503; and application Ser. No. 08/062,969.

BACKGROUND OF THE INVENTION

1. Field of the Invention

The present invention relates to a head-retract circuit for a moving media data storage apparatus, and more particularly to a head-retract circuit powered by the inductive flyback voltage spikes and back emf voltage generated by a motor of the moving media storage apparatus.

2. Description of the Prior Art

Moving media data storage devices, such as hard disk drives and optical disk drives, are typically incorporated into battery-powered portable computers to provide non-volatile memory storage. A disk drive includes a spindle motor for rotating one or more information-bearing disks and a voice-coil motor for positioning one or more read/write heads adjacent desired sectors of the information-bearing disks. When the spindle motor is stopped, the read/write heads come to rest on safe sectors of the disks; that is, sectors of the disks which do not contain encoded data. The safe sectors are typically located at the inner or outer periphery of the disk. The read/write heads are aerodynamically formed such that they fly over the data bearing surface on air currents created by the rotation of the disk.

Unexpected disconnection or failure of the battery can result in a loss of memory and, in some cases, damage to the moving media data storage device. During normal power-down procedures, the read/write heads are retracted to the safe sectors before they contact the surface of the disks. However, when an unexpected loss of battery power occurs and the air currents supporting the read/write heads are lost, the read/write heads can "crash" against sectors of the disks which contain encoded data, thereby causing a loss of stored information and possibly damaging the disks.

To prevent head damage or loss of stored information, the head-retract circuitry is typically powered by the back electromotive force (emf) generated by the rotating motor when the battery is suddenly lost. During the emergency head-retract procedure, the motor, acting as a generator, supplies power to the voice-coil motor such that the read/write head is moved to a safe sector of the disk before it comes into contact with the disk.

FIG. 1 shows a simplified circuit diagram of a moving media storage device 800 which includes a prior art head actuator 810 having circuitry for automatically retracting a read/write head (not shown). The storage device 800 also includes a spindle driver 820 for driving a spindle motor 830, a voice-coil motor 840 connected to the head actuator 810, and a Schottky diode 850. A battery 805, which is typically located outside of the storage device 800, is connected to an anode of the Schottky diode 850 to provide an operating potential. In this description of the prior art, the voltage provided by the battery 805 is referred to as $V_{BAT}$, and the operating potential applied to the spindle driver 820 and the head actuator 810 (after a voltage drop associated with the Schottky diode 850) is referred to as $V_{CC}$.

The spindle driver 820 is connected between $V_{CC}$ and ground, and generates a driving signal which is transmitted to a spindle motor 830. The spindle driver 820 includes a servo controller 821, for generating control signals, and three push-pull halfbridge circuits 822, 823 and 824, each comprising a highside MOSFET 825 and a lowside MOSFET 826.

The sources and bodies of MOSFETs 825 and 826 are shorted together. Thus each of the highside MOSFETs 825 includes an intrinsic antiparallel diode A1 between its drain and source which is reverse-biased during normal current flow through MOSFET 825. Similarly, each of the lowside MOSFETs 826 includes an intrinsic antiparallel diode A2 between its drain and source which is reverse-biased during normal current flow. Halfbridges 822, 823 and 824 produce output signals $V_{OUTA}$, $V_{OUTB}$ and $V_{OUTC}$, which are delivered to respective input terminals of motor 830. The head actuator 810 is connected between $V_{CC}$ and ground, and generates a head positioning signal which is transmitted to voice-coil motor 840. The head actuator 810 includes a head-control circuit 811, a head-retract circuit 812 and two push-pull halfbridge circuits 813 and 814, each comprising a highside MOSFET 815 and a lowside MOSFET 816, which are connected together source-to-drain in a totem pole manner. The source and body of each of MOSFETs 815 and 816 are shorted. The head control circuit 811 receives a sector identification signal from a host computer (not shown) and feedback signals from a read/write head, and generates control signals which are applied to the gates of the highside MOSFETs 815 and lowside MOSFETs 816. The head-retract circuit 812 detects a power failure and applies head-retract control signals to the gates of the highside MOSFETs 815 and the lowside MOSFETs 816. Halfbridges 813 and 814 generate output signals $V_{OUTD}$ and $V_{OUTE}$, which are delivered to respective terminals of voice-coil motor 840. Both the highside MOSFETs 815 and the lowside MOSFETs 816 include intrinsic antiparallel diodes (not numbered) between their sources and drains. The gate of each of MOSFETs 815 and 816 is connected to receive control signals generated by the head-controller 811, such that the halfbridges generate a head positioning signal ($V_{OUTD}$ and $V_{OUTE}$) to drive the voice-coil motor 840 so as to move the read/write head over a safe sector of the disk.

In operation, $V_{BAT}$ is applied to the anode of the Schottky diode 850, thereby producing $V_{CC}$ which is approximately 0.5 volts lower than $V_{BAT}$. $V_{CC}$ is applied to the spindle driver 820 and the head actuator 810.

In the spindle driver, in a known manner the servo control circuit 821 generates control signals which are applied to the highside MOSFETs 825 and lowside MOSFETs 826 of the halfbridges 822, 823 and 824. For example, a high control signal applied to the gate of MOSFET 825 causes the MOSFET to turn on and to apply $V_{CC}$ to one pole of the spindle motor 830. At the same time, a low control signal is applied to the gate of MOSFET 826 thereby connecting the other pole of motor 830 to ground and creating a driving potential in the spindle motor 830. The servo control circuit 821 alternates the control signals applied to the highside MOSFETs 825 and the lowside MOSFETs 826 to produce a three-phase driving signal which causes the spindle motor 830 to rotate at a desired rate.

In the head actuator 810, the head control circuit 811 receives sector identification signals from the host computer and feedback signals from the read/write head and generates control signals which are applied to highside MOSFETs 815 and lowside MOSFETs 816. The amplitudes of the control signals are determined by the sector identification signals and from the feedback signals received from the read/write head. During normal operation, the head-retract circuit 812 does not function.

When a battery failure occurs, $V_{BAT}$ drops to ground (or some other low potential), thereby reverse-biasing the Schottky diode 850 and isolating $V_{CC}$ from $V_{BAT}$. In addition, the spindle driver 820 and head actuator 810 operate as follows.

In the spindle driver 820, kinetic energy stored in the spindle motor 830 generates a back emf at its input. The intrinsic anti-parallel diode A1 of each highside MOSFET 825 is forward-biased by the back emf and, with Schottky diode 850 reverse-biased, the power generated by motor 830 is delivered to head actuator 810. Ideally, the back emf generated by motor 830 lasts long enough to enable head actuator 810 to move the head to a safe sector of the disk.

In the head actuator 810, the loss of $V_{BAT}$ is sensed by the head-control circuit 811 and the head-retract circuit 812. The head-retract circuit 812 applies a retract control signal to the gates of the highside MOSFETs 815 and the lowside MOSFETs 816, which causes the voice-coil motor 840 to move the read/write head over a safe sector of the information-bearing disk.

A problem associated with prior art head storage device is that a voltage of 1.4 volts or more is required to drive the MOSFETs of the head actuator 810. This is the gate to source potential (Vgs) that is required to turn on MOSFETs 815 and 816. Most power MOSFETs, whether discrete or integrated, have little current drive capability when Vgs is equal to or less than 1.4 volts, and must be greatly oversized to satisfy this condition. During normal operation, $V_{CC}$ is typically 4.5 volts. Since the MOSFETs in the head actuator generally draw significant amounts of current, the loss of $V_{BAT}$ during a battery failure can cause $V_{CC}$ to drop from 4.5 volts to 1.4 volts very quickly.

Another problem with the prior art storage device is that the 0.5 volt diode drop associated with the Schottky diode 850 unnecessarily reduces the driving potential applied to the spindle motor 830, and hence reduces the back emf generated by the spindle motor 830 when the driving potential is removed. The back emf generated by motor 830 cannot be greater than $V_{CC}$. In some cases, this reduction may cause $V_{CC}$ to decay before a successful emergency head-retract procedure can be performed.

Moreover, because a current of several amps or more is required to drive the spindle motor 830 and the voice-coil motor 840, up to a watt of power is lost due to the Schottky diode 850 during normal operation. For example, since a typical portable computer is powered by a 5 volt battery, the 0.5 volt diode drop due the Schottky diode 850 reduces the available motor driving potential by 10%. Further, with the trend toward portable computers driven by 3 volt batteries, this reduction in available driving potential increases to 17%.

SUMMARY OF THE INVENTION

In accordance with the present invention, a moving media storage apparatus is provided with an auxiliary voltage supply which is created by the inductive flyback voltage spikes generated by a spindle motor during normal operation. The normal source-body shunts in the highside MOSFETs in the spindle motor driver are eliminated, yielding an intrinsic diode at the source-body junction which is aligned in opposition to reverse current flow through the MOSFETs. This permits the customary Schottky diode in the battery supply line to be removed and means that the full battery potential is delivered to the spindle motor.

The outputs of the spindle motor driver are connected through rectifier diodes to a reservoir capacitor, thus permitting the inductive flyback voltage spikes generated by the spindle motor to be used to charge the reservoir capacitor. The voltage on the reservoir capacitor constitutes an auxiliary voltage ($V_{AUX}$) which is used to supply the head actuator. $V_{AUX}$ is typically higher than the battery voltage. A Schottky diode (or equivalent) is placed between $V_{AUX}$ and the battery (but not between the spindle motor and the battery), to prevent current from flowing from the reservoir capacitor to the battery. The battery normally supplies current to the head actuator through the Schottky diode. A Zener diode is connected in parallel with the reservoir capacitor to prevent the voltage on that capacitor from reaching a level at which the diodes within the MOSFETs may begin to avalanche.

In a second embodiment, the Schottky diode is replaced by the parallel combination of a switch (MOSFET) and a diode, which reduces the voltage drop seen by the voice coil motor. During normal operation, the switch remains closed. During start-up, the diode conducts while $V_{AUX}$ is less than the battery voltage, until the switch becomes adequately enhanced. In the event of battery failure, the MOSFET is turned off by an undervoltage signal so that the head actuator is isolated from the battery. The back emf generated by the spindle motor powers the head actuator until the head is retracted.

In another embodiment according to the invention, the source-body shorts in the high side MOSFETs in the voice coil motor driver are eliminated, and their bodies are coupled to ground. A pair of bipolar transistors are connected, respectively, between $V_{AUX}$ and one of the inputs to the voice coil motor and between the other input of the voice coil motor and ground. These bipolar transistors take over for the MOSFETs in the event of battery failure. During normal operation the MOSFETs in the head actuator are supplied directly from the battery. The inputs to the voice coil motor are coupled through rectifier diodes to $V_{AUX}$, thus providing the reservoir capacitor with a secondary source of inductive flyback spikes during normal operation. The head actuator is connected to the battery without any intervening isolation diode. Thus, in this embodiment both the spindle motor and the voice coil motor are powered by the full battery potential. Moreover, the voice coil motor driver places less of a load on the auxiliary voltage supply if the battery fails or is disconnected.

The combined effect of these features is that, following a battery failure, the back emf of the spindle motor is initially at a higher level (aided by the stored $V_{AUX}$) and the head actuator continues to function at lower voltage levels because bipolar transistors have been substituted for the MOSFETs.

A fourth embodiment is similar to the preceding embodiment except that a switch (MOSFET) and a diode are connected between the battery and $V_{AUX}$, in the same manner as in the second embodiment. The function of the diode and switch is to normalize the battery voltage and $V_{AUX}$, thereby reducing any ripple in $V_{AUX}$ resulting from the spindle motor commutation noise.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE PREFERRED EMBODIMENTS

FIRST EMBODIMENT

Figure 2:
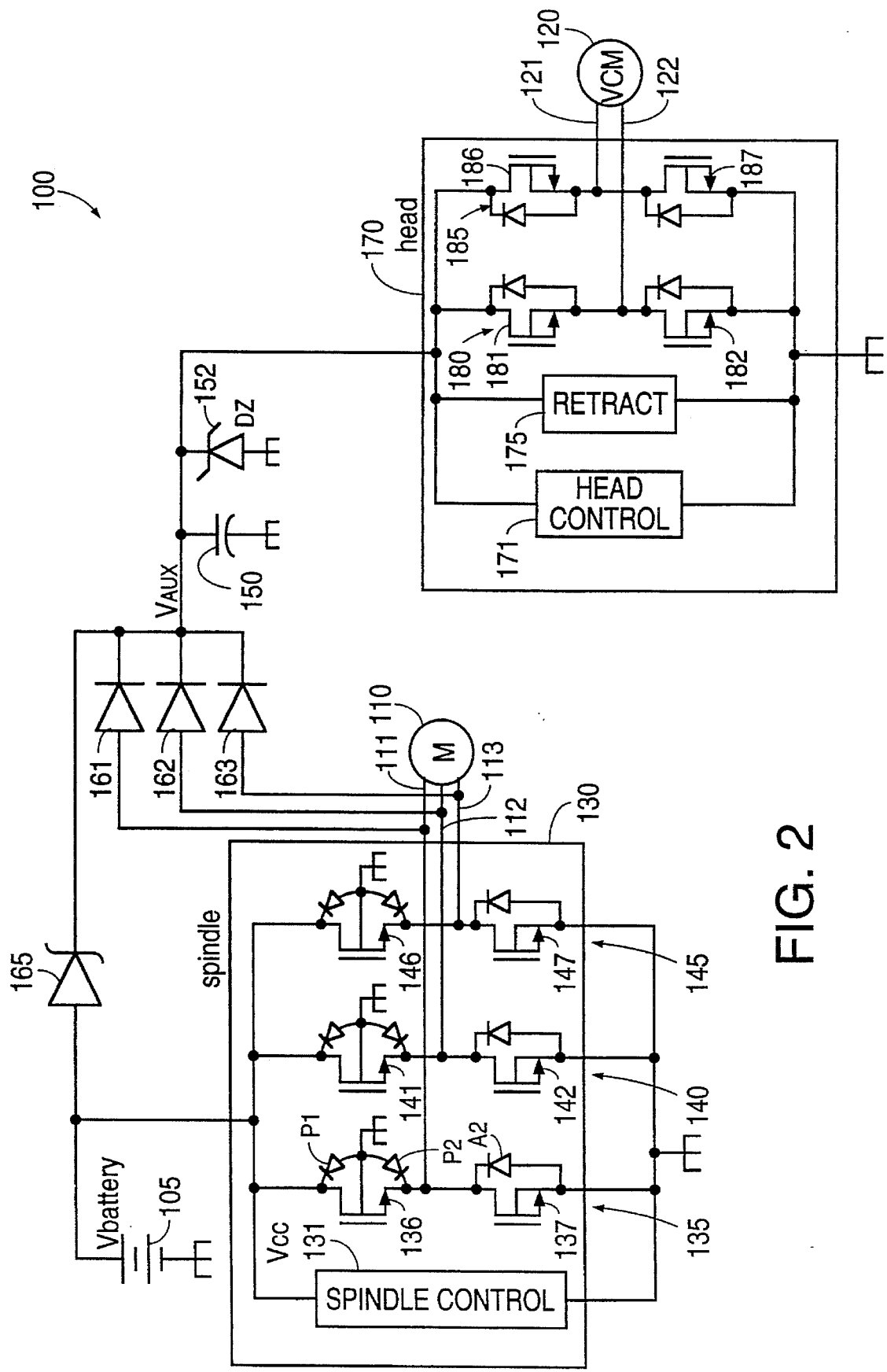
FIG. 2 shows a circuit diagram of a moving media storage apparatus according to a first embodiment of the present invention.

FIG. 2 illustrates a movable media storage apparatus 100 according to a first embodiment of the present invention. Movable media storage apparatus 100 includes a spindle motor 110, a voice-coil motor 120, a spindle driver 130, a reservoir capacitor 150 and a head actuator 170. The apparatus 100 is connected to receive power from a battery 105, but can be used in a system driven by another type of power source.

In the description of the first embodiment, the term "$V_{BAT}$" identifies a potential provided by the battery 105 The term "$V_{AUX}$" identifies the voltage across capacitor 150.

The spindle motor 110 is a three-phase motor including a first pole 111, a second pole 112 and a third pole 113. The spindle motor 110 receives a three-phase spindle motor driving signal from the spindle driver 130 and, in response, rotates one or more information bearing disks at a predetermined rate.

The voice-coil motor 120 is a two-phase motor including a first pole 121 and a second pole 122. The voice-coil motor 120 receives a head positioning signal from the head actuator 170 and, in response, positions one or more read/write heads over selected sectors of a rotating information bearing disk.

The spindle driver 130 generates the three-phase spindle motor driving signal which is applied to the spindle motor 110. The spindle driver 130 includes a servo controller 131, a first push-pull halfbridge 135, a second push-pull halfbridge 140, and a third push-pull halfbridge 145.

The servo controller 131 is connected to $V_{BAT}$ and generates control signals which are applied to the halfbridges 135, 140 and 145, as discussed below.

As shown, halfbridge 135 includes a highside N-channel MOSFET 136 and a lowside N-channel MOSFET 137. The highside MOSFET 136 has a gate connected to receive a control signal from the servo controller 131. The highside MOSFET 136 does not include a source-body short. Instead, intrinsic diodes P1 and P2 are formed between the body (ground) and the drain and source, respectively, of MOSFET 136. Note that the intrinsic diodes P1 and P2 are always reverse-biased. Lowside MOSFET 137 also has a gate which is connected to receive a control signal from the servo controller 131. As in the prior art MOSFET structure, discussed above, the lowside MOSFET 137 includes an intrinsic antiparallel diode A2 between the source/body and the drain which is reverse-biased when a positive potential is applied to the drain.

Halfbridge 140 includes a highside MOSFET 141 having a drain connected to $V_{BAT}$, a source connected to the pole 112 of the spindle motor 110, and a grounded body. In addition, halfbridge 140 includes a lowside MOSFET 142 having a drain connected to the second pole 112, and a source connected to ground. As indicated in FIG. 2, highside MOSFET 141 and lowside MOSFET 142 have the same construction as the highside MOSFET 136 and lowside MOSFET 137 of halfbridge 135.

Likewise, halfbridge 145 includes a highside MOSFET 146 having a drain connected to $V_{BAT}$, a source connected to the pole 113 of the spindle motor 110, and a grounded body. Halfbridge 145 also includes a lowside MOSFET 147 having a drain connected to the third pole 113, and a source connected to ground. Highside MOSFET 146 and lowside MOSFET 147 have the same construction as highside MOSFET 136 and lowside MOSFET 137 of halfbridge 135, as discussed above.

As shown in FIG. 2, reservoir capacitor 150 is connected via rectifier diodes 161, 162 and 163 to the poles 111, 112 and 113, respectively, of the spindle motor 110. The other terminal of capacitor 150 is connected to ground. A zener diode 152 is connected in parallel with the capacitor 150. Diodes 161–163 prevent capacitor 150 from discharging to spindle driver 130.

A Schottky diode 165 is connected between battery 105 and the cathodes of the diodes 161, 162 and 163. During normal operation, the battery 105 is used to drive the head actuator 170 and the voice-coil motor 120 through the Schottky diode 165. However, when the battery 105 is disconnected, the Schottky diode 165 becomes reverse biased, and capacitor 150 is charged by the back emf generated by the spindle motor 110, as described below.

The head actuator 170 includes a head-control circuit 171, a head-retract circuit 175, a first halfbridge 180 and a second halfbridge 185.

The head-control circuit 171 is connected to $V_{AUX}$ and generates control signals which are applied to the first and second halfbridges 180 and 185 to create a desired potential across the voice-coil motor 120 such that the read/write head is positioned over selected sectors of the disk. The control signals are determined in response to section identification signals received by the head-control circuit 171 from a host computer, and feedback signals received from the head.

The retract circuit 175 is connected to $V_{AUX}$ and transmits a head-retract signal to the poles of the voice-coil motor 120 when the battery 105 is disconnected or fails, as discussed below.

Figure 1:
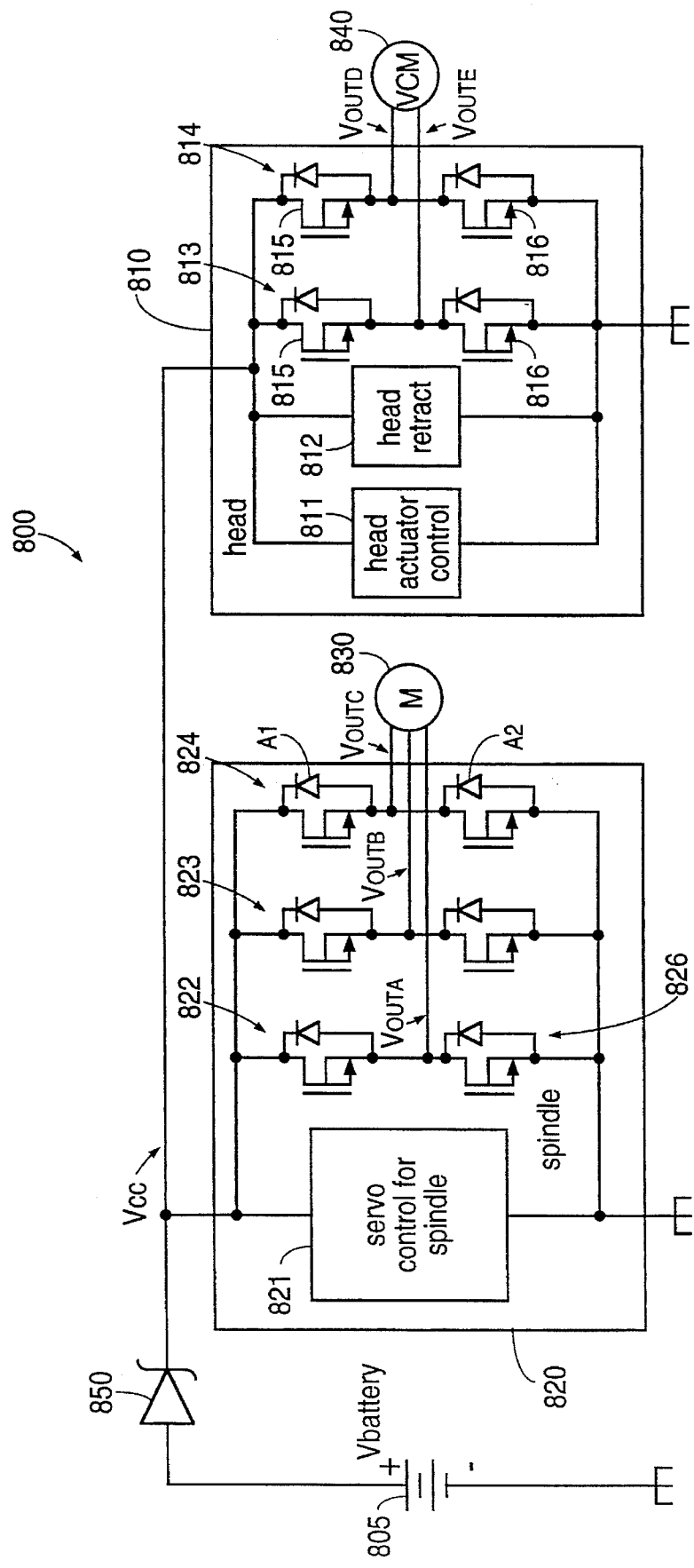
FIG. 1 shows a circuit diagram of the spindle motor driver and voice coil motor driver in a prior art movable media storage device.

The first and second halfbridges 180 and 185 combine to generate a driving potential which is applied to the poles of the voice-coil motor 120 in response to the head control signals generated by the head-control circuit 171. The first halfbridge 180 includes a highside N-channel MOSFET 181 having a drain connected to $V_{AUX}$, a source connected to pole 122 of the voice-coil motor 120, a body shorted to the source, and a gate connected to receive a head-control signal from the head-control circuit 171. The first halfbridge 180 also includes a lowside N-channel MOSFET 182 having a drain connected to pole 122 of the voice-coil motor 120, a source connected to ground, a body shorted to the source, and a gate connected to the head-control circuit 171. Halfbridge 185 includes a highside MOSFET 186 and a lowside MOSFET 187 which include the same connections as those in halfbridge 185, with the exception that the highside MOSFET 186 and lowside MOSFET 187 are connected to the second pole 121 of the voice-coil motor 120. The structure of the first halfbridge 180 and the second halfbridge 185 is similar to the structure shown in FIG. 1.

Operation of the moving media storage apparatus 100 according the first embodiment of the present invention will now be described.

When the battery 105 is initially connected to the storage apparatus 100, $V_{BAT}$ is applied to the spindle driver 130 and the anode of the Schottky diode 165. Note that, because a Schottky diode is not located between and the spindle driver 130, the spindle driver 130 receives a larger driving potential than is possible in the prior art apparatus 100, discussed above, for the same battery 105.

After $V_{BAT}$ is connected to the spindle driver 130, control signals generated by the servo controller 131 are applied to the gates of the highside MOSFETs 136, 141 and 146 and the lowside MOSFETs 137, 142 and 147, thereby selectively turning on and off the highside MOSFETs 136, 141 and 146 to connect the poles 111, 112 and 113 of the spindle motor 110 to $V_{BAT}$, and turning on and off the lowside MOSFETs 137, 142 and 147 to connect the poles 111, 112 and 113 to ground. In a well known manner, the control signals applied to each of the halfbridges 135, 140 and 145 are coordinated by the servo controller 131 such that a three-phase driving potential is applied to the spindle motor 110, thereby causing rotation of the disk. In addition, during the positive voltage transition of halfbridges 135, 140 and 145 inductive flyback voltage spikes are generated at poles 111, 112 and 113, and these voltages spikes cause currents to flow through diodes 161, 162 and 163, charging capacitor 150 to a $V_{AUX}$ somewhat higher than $V_{BAT}$.

In addition to the charge received from the spindle driver 130, current flows to head actuator 170 through the Schottky diode 165. During normal operation, the Schottky diode 165 remains forward-biased, thereby providing a current which is adequate for driving the head actuator 170.

This energy transfer enables the head actuator 170 to position the read/write head over selected sectors of the disk. The head-control circuit 171 generates control signals which are applied to the gates of the highside MOSFETs 181 and 186 and the lowside MOSFETs 182 and 187. The control signals are determined in response to section identification signals received by the head-control circuit 171 from the host computer, and feedback signals received from the read/write head. In response to the control signals, the highside MOSFETs 181 and 186 and the lowside MOSFETs 182 and 187 are selectively turned on and off to generate a potential across the voice-coil motor 120 which positions the head over the selected sectors.

When the battery 105 is disconnected or fails, the following events occur. First, as indicated, $V_{BAT}$ drops to ground, thereby reverse biasing the Schottky diode 165 and isolating $V_{AUX}$ from $V_{BAT}$. In addition, the loss of $V_{BAT}$ prevents the servo controller 131 from producing control signals; therefore, the highside MOSFETs 136, 141 and 146 and the lowside MOSFETs 137, 142 and 147 are turned off. The momentum of a rotor in spindle motor 110 causes the creation of a back emf which takes the form of an AC signal applied to the poles 111, 112 and 113 of the spindle motor 110. Because the highside MOSFETs 136, 141 and 146 are constructed without a source-body short, the diodes P2 are reverse-biased, preventing the positive transitions of the emf from flowing through the highside MOSFETs 136, 141 and 146. Instead, the positive transitions are applied to the anodes of the diodes 161, 162 and 163, which allow currents to flow to head actuator 170. Diodes 161, 162 and 163 are forward-biased by these positive transitions until the spindle motor 120 slows such that the level of the spikes falls below the threshold voltage of the diodes 161, 162 and 163.

Concurrently, a loss of $V_{BAT}$ is detected by the head-retract circuit 175 of the head actuator 170, which responds by applying high and low signals on the respective poles of the voice-coil motor 120, thereby causing the voice-coil motor 120 to rotate, resulting in a retraction of the read/write head to a "safe" sector.

The moving media storage apparatus 100 according to the first embodiment of the present invention avoids the problems associated with the prior art by eliminating the need to locate a Schottky diode between the battery 105 and the spindle driver 130, as required in the prior art. This is effected by eliminating the source-body short in the highside MOSFETs 136, 141 and 146 of the spindle driver 130. Diodes P2 in effect take the place of Schottky diode 165. This produces a higher driving potential for driving the spindle motor 110, which therefore starts at a high emf-voltage when a battery disruption occurs. Because the back emf decays at essentially the same rate, this means that more time is available for assuring the completion of an emergency head-retract procedure.

In addition, because the head actuator 170 and the voice-coil motor 120 draw substantially less current than the spindle driver 130 and the spindle motor 110, much less power is lost in the Schottky diode 165 than in the prior art apparatus, thereby increasing the life of the battery 105.

SECOND EMBODIMENT

Figure 3:
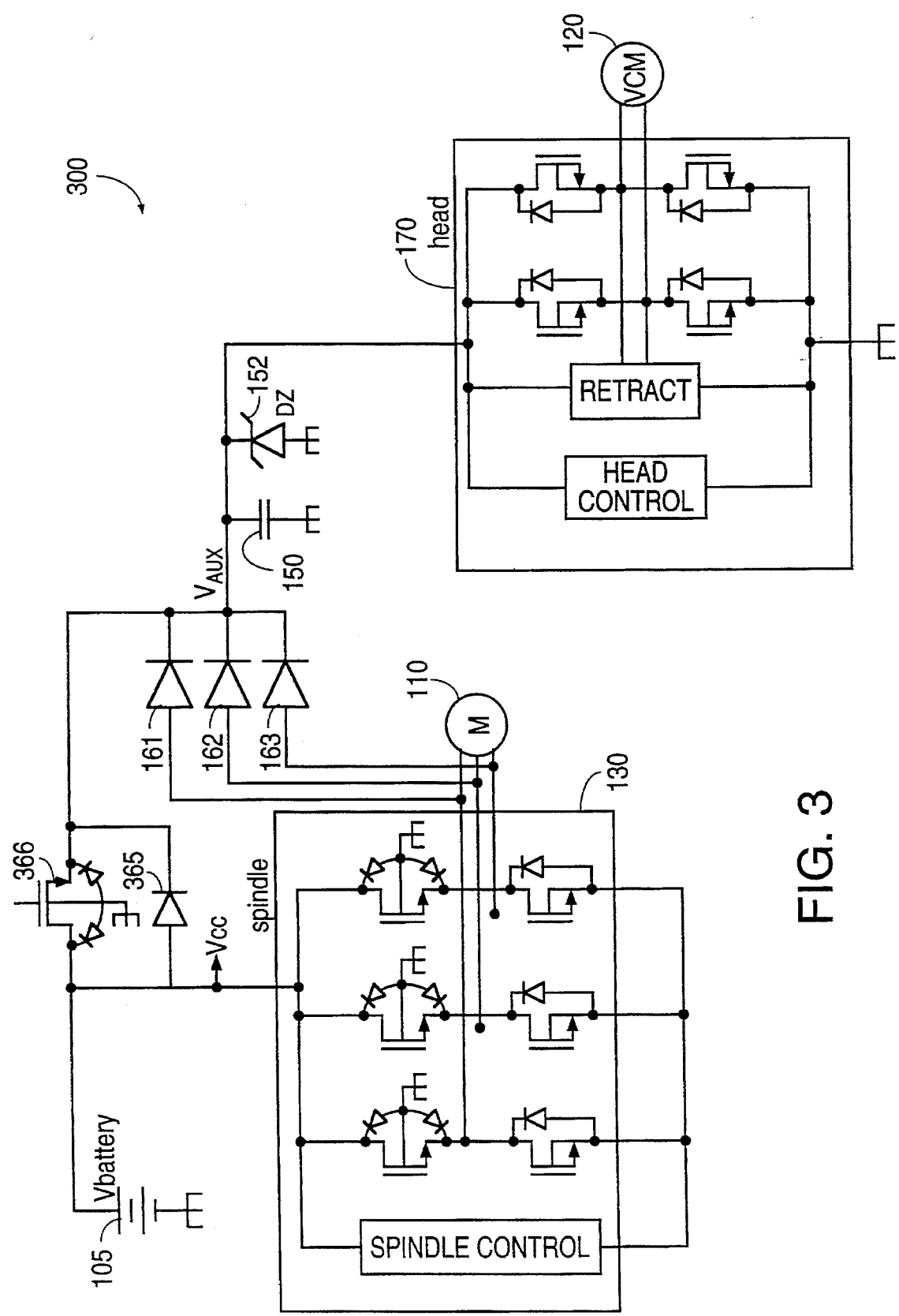
FIG. 3 shows a circuit diagram of a moving media storage apparatus according to a second embodiment of the present invention.

FIG. 3 shows a circuit diagram of a moving media storage apparatus 300 according to a second embodiment of the present invention. The apparatus 300 includes the spindle motor 110, the voice-coil motor 120, the spindle driver 130, the reservoir capacitor 150, the head actuator 170 and the rectifier diodes 161–163 of the first embodiment. The apparatus 300 differs from the apparatus 100 in that an N-channel MOSFET 366 is connected in parallel with a diode 365, and the parallel combination is substituted for Schottky diode 165. The MOSFET 366 has no source-body short, and its body is grounded.

During start-up, the MOSFET 366 is turned off and a relatively small current flows to head actuator 170 through the diode 365. With the MOSFET 366 on, it introduces only a very small voltage drop (~0.2V) in the supply line running from battery 105 to head actuator 170. Moreover, $V_{AUX}$ and $V_{BAT}$ are normalized, thereby reducing any supply ripple in $V_{AUX}$ caused by commutation noise generated by the spindle motor 110. If a battery failure occurs, the MOSFET 366 is turned off and the diode 365 is reversed-biased, thereby isolating head actuator 170 from battery 105. Because MOSFET 366 does not have an intrinsic antiparallel diode, $V_{AUX}$ is not discharged onto $V_{BAT}$ through the MOSFET 366.

Note that if the MOSFET 366 is constructed as N-channel MOSFET, the diode 365 is a separate component. However, if the MOSFET 366 is a P-channel device, then the diode 365 is intrinsic. The gate of MOSFET 366 is driven by a signal which goes high or low depending on the level of $V_{BAT}$ or $V_{AUX}$. Such signals can be provided by a number of known devices (e.g., a comparator).

THIRD EMBODIMENT

Figure 4:
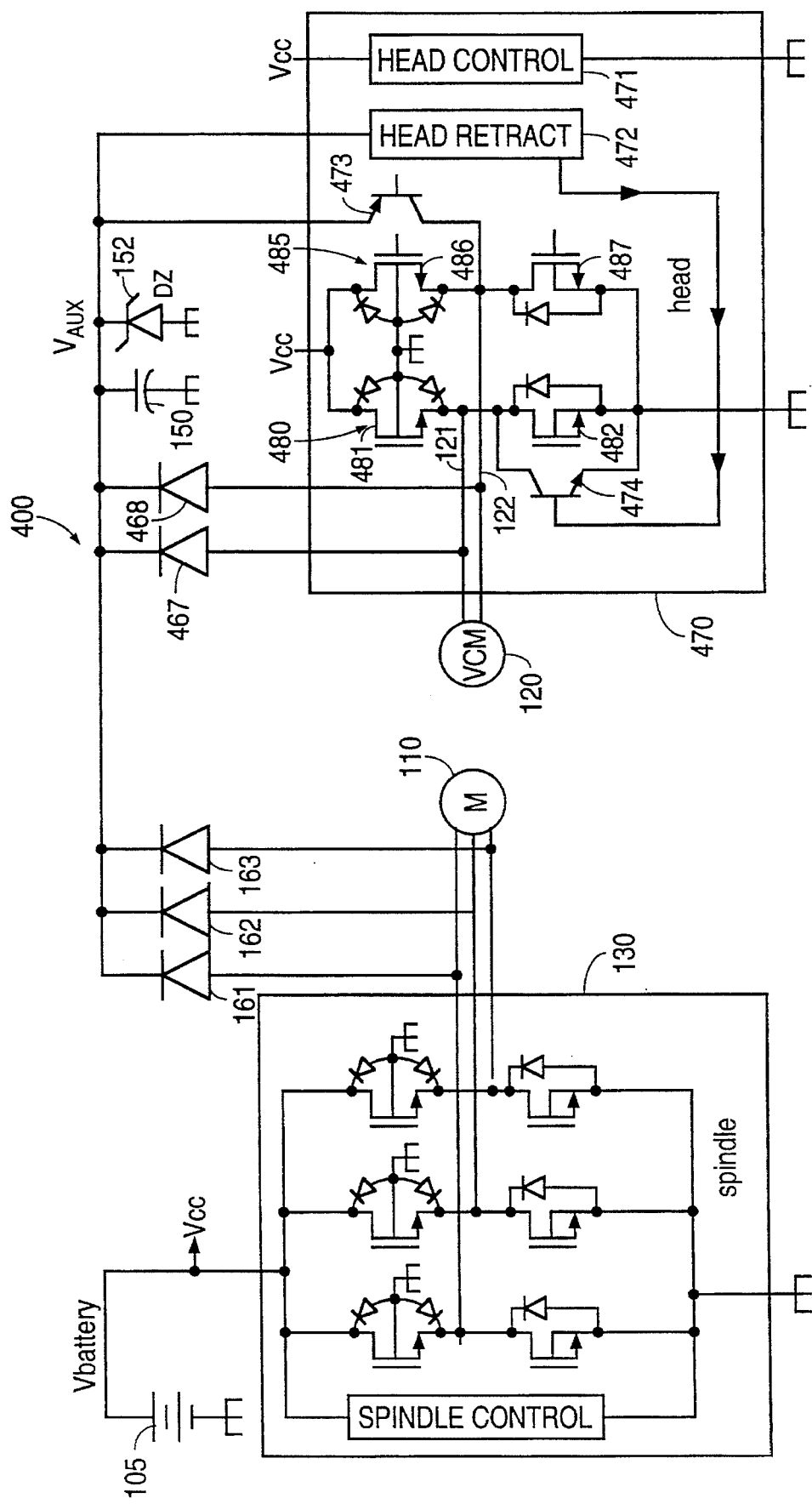
FIG. 4 shows a circuit diagram of a movable media storage apparatus according to a third embodiment of the present invention.

FIG. 4 shows a simplified circuit diagram of a moving media storage apparatus 400 according to a third embodiment of the present invention.

In accordance with the third embodiment, the apparatus 400 includes the battery 105, the spindle motor 110, the voice-coil motor 120, the spindle driver 130, the reservoir capacitor 150 and the diodes 161, 162 and 163 of the apparatus 100 according to the first embodiment, discussed above. The apparatus 400 differs from the apparatus 100 of the first embodiment in the apparatus 400 does not include the Schottky diode 165, which is connected between battery 105 and capacitor 150 in the first embodiment. Apparatus 400 includes a head actuator 470 having a head-control circuit 471, a halfbridge 480 and a halfbridge 485 which are connected to $V_{CC}$ (equivalent to $V_{BAT}$ in this embodiment), and a head-retract circuit 472 which is connected to $V_{AUX}$. A PNP bipolar transistor 473 is connected between $V_{AUX}$ and pole 122 and an NPN bipolar transistor 474 is connected between pole 121 and ground. Diodes 467 and 468 connect poles 121 and 122, respectively, to $V_{AUX}$. These diodes act as rectifiers to transmit flyback spikes generated by the voice-coil motor 120 to $V_{AUX}$ to limit the maximum voltage developed on poles 121 and 122.

Halfbridge 480 includes a highside MOSFET 481 having a drain connected to $V_{CC}$, a source connected to pole 121 of the voice-coil motor 120, a grounded body, and a gate connected to receive a control signal from the head control circuit 471. Halfbridge 480 includes a lowside MOSFET 482 having a drain connected to pole 121, a source-body connected to ground, and a gate connected to receive a control signal from the head control circuit 471. Halfbridge 485 includes a highside MOSFET 486 and a lowside MOSFET 487 which are identical to the highside MOSFET 481 and lowside MOSFET 482, with the exception that the highside MOSFET 486 and lowside MOSFET 487 are connected to the pole 122 of the voice-coil motor 120. Note that the structure of the halfbridge 480 and the halfbridge 485 is similar to the halfbridge structure used in the spindle driver 130 (see FIG. 2). Since the halfbridges 480 and 485 of the head actuator 470 are not used for head-retract procedures, the highside MOSFETs 481 and 486 can be constructed without a source-body short, as in the spindle driver 130. Therefore, since there is no antiparallel diode in MOSFETs 481 and 486, the inductive flyback spikes on poles 121 and 122 of the voice-coil motor 120 may be used to help charge capacitor 150.

Also in accordance with the third embodiment, the head-retract circuit 472 is connected to $V_{AUX}$ and generates control signals applied to the bases of the bipolar transistors 473 and 474 when $V_{BAT}$ fails. Bipolar transistor 473 has an emitter connected to $V_{AUX}$ and a collector connected to pole 122 of the voice-coil motor 120. Alternatively, bipolar transistor 473 may be a NPN follower with its collector connected to $V_{AUX}$ and its emitter tied to pole 122. Bipolar transistor 474 has an emitter connected to ground and a collector connected to the first pole 121.

During normal operation, flyback spikes from spindle motor 110 charge capacitor 150, creating $V_{AUX}$. Voice coil motor 120 and spindle motor 110 are driven directly by the battery voltage, with no losses from intervening diodes. If the battery fails, halfbridges 480 and 485 are shut down via head control circuit 471 which shorts each MOSFET's gate to its respective source. While MOSFET 482 may remain on, MOSFET 486 must be turned off to prevent the collapsing $V_{CC}$ from disturbing the head retract. Bipolar transistors 473 and 474 are controlled by head retract circuit 472 with energy supplied by $V_{AUX}$, which in turn receives energy from the back emf's of spindle motor 110 and voice coil motor 120. Since bipolar transistors 473 and 474 can be biased for high collector currents by a base voltage as low as 0.7 V, they continue to conduct to a lower $V_{AUX}$ than MOSFETs 481, 482, 486 and 487. The available stored energy is conserved as much as possible to ensure that the head can be fully retracted.

Figure 5:
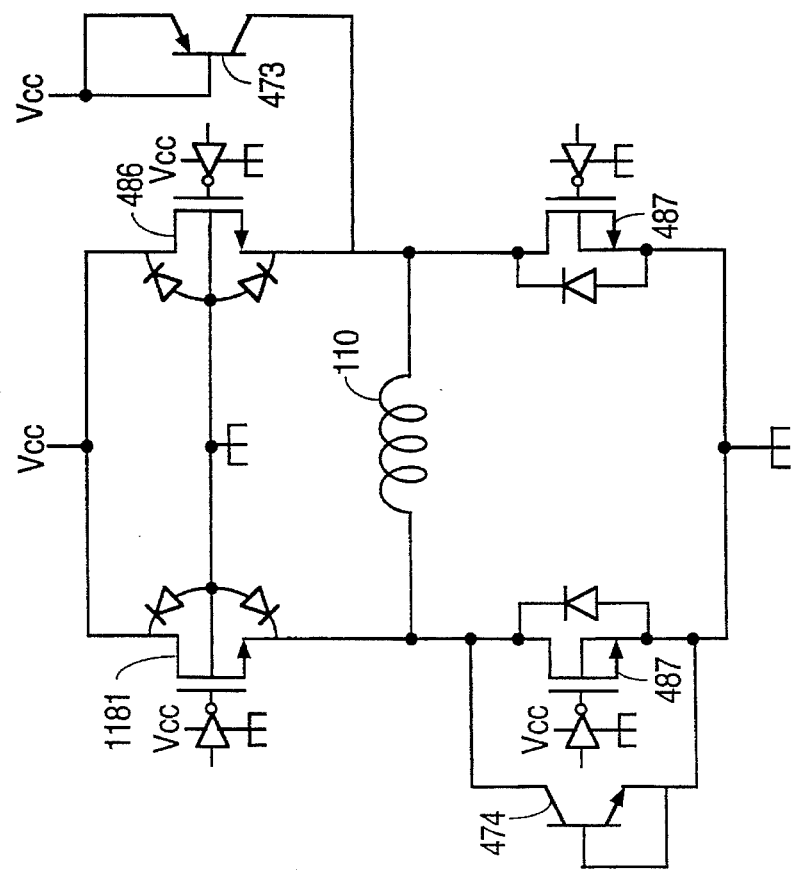
FIG. 5 shows a partial equivalent circuit diagram of a head actuator of FIG. 4 during normal operation.

FIG. 5 shows an equivalent circuit indicating the normal operation of the head actuator 470 of the apparatus 400. As shown in FIG. 5, during normal operation the conductive state of the highside MOSFETs 481 and 486 and the lowside MOSFETs 482 and 487 are determined by control signals received from the head-control circuit 471 (FIG. 4) and are driven by standard CMOS inverters. In addition, $V_{AUX}$ is applied to the emitter and (through head retract circuit 472) base of bipolar transistor 473, and the emitter and (through head retract current 472) base of bipolar transistor 474 are connected to ground.

Figure 6:
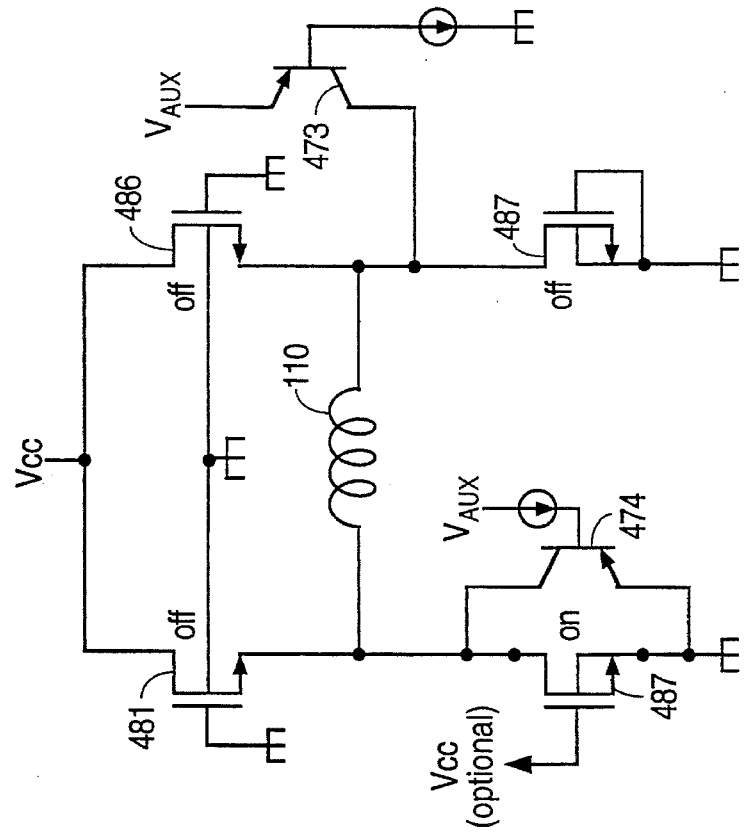
FIG. 6 shows a partial equivalent circuit diagram of a head actuator of FIG. 4 during a head-retract procedure.

FIG. 6 shows the same circuit during a head-retract procedure.

Figure 7:
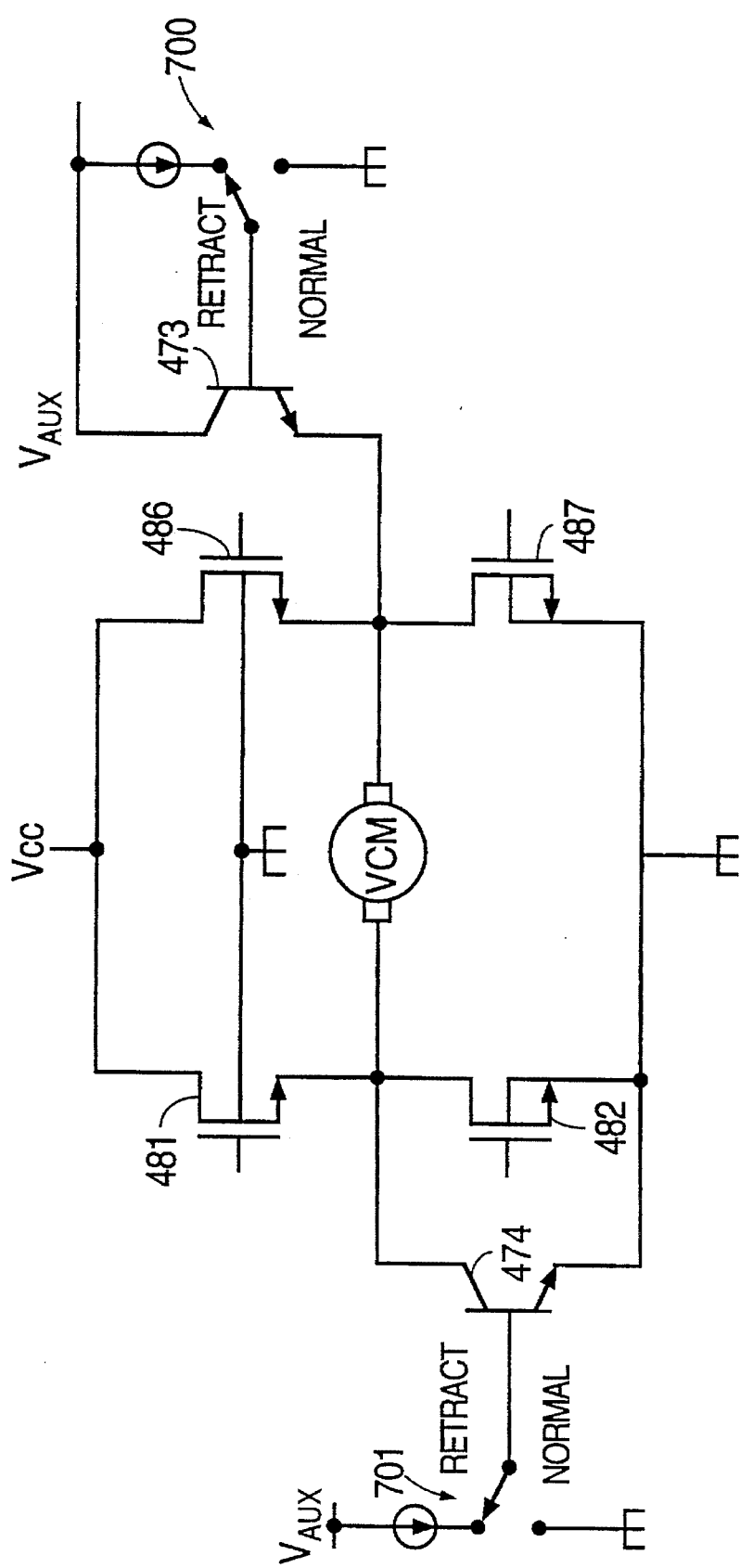
FIG. 7 illustrates the control of the bipolar transistors in the third embodiment.

FIG. 7 illustrates that the bases of transistors 473 and 474 are driven by switches 700 and 701, which during retract open and close in response to signals from head retract circuit 472. During normal operation, switches 700 and 701 are held in the "Normal" position, grounding the bases of transistors 473 and 474.

By incorporating the bipolar transistors 473 and 474 into the apparatus 400, a lower auxiliary potential can be used to drive the voice-coil motor 120 during a head-retract procedure. As discussed above, a Vgs potential of at least 2.5 volts is necessary to drive the highside MOSFETs 481 and 486 and the lowside MOSFETs 482 and 487. By incorporating bipolar transistors 473 and 474 to bypass these MOSFETs, the time allowed for a head-retract procedure is greatly improved because $V_{AUX}$ can be used to effect the head-retract procedure down to approximately 1.4 volts.

FOURTH EMBODIMENT

Figure 8:
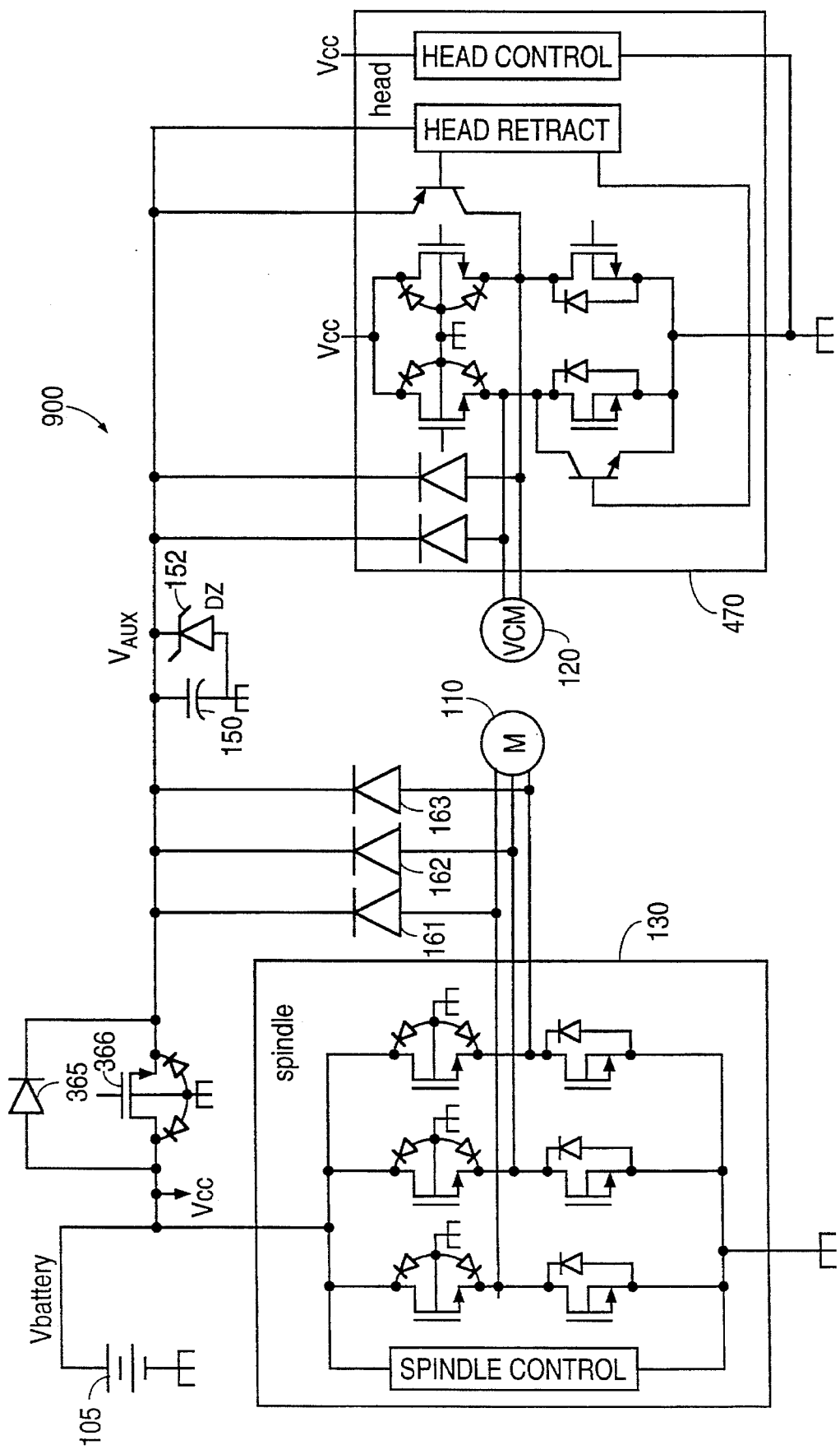
FIG. 8 shows a circuit diagram of a movable media storage apparatus according to a fourth embodiment of the present invention.

FIG. 8 shows a circuit diagram of a moving media storage apparatus 900 according to a fourth embodiment of the present invention. The apparatus 900 includes all of the components of the apparatus 400 of the third embodiment (FIG. 4), and in addition includes the parallel combination of MOSFET 366 and diode 365 as shown in the second embodiment (FIG. 3). By incorporating diode 365 and MOSFET 366, the apparatus 900 of the fourth embodiment provides the reduction of commutation noise of the spindle motor 120, as discussed above.

Although the present invention has been described in considerable detail with reference to certain preferred embodiments thereof, other embodiments are possible. For example, the NMOS totem-pole structure used in the spindle driver 130 can be replaced by a CMOS structure, as described in above mentioned U.S. application Ser. No. 08/062,504, U.S. Pat. No. 5,377,094, "PUSH-PULL OUTPUT STAGE FOR DRIVING MOTORS WHICH GENERATES AUXILIARY VOLTAGE SUPPLY". Further, the second bipolar transistor 474 may be either NPN or PNP, and the high side MOSFETs in the spindle driver and the head actuator may be P-channel as well as N-channel. If P-channel MOSFETs are used, their bodies can be corrected to $V_{AUX}$ directly, as shown in FIG. 4 of the above-referenced Application Ser. No. 08/062,969, and the rectifier diodes can be omitted. Therefore, the spirit and scope of the appended claims should not be limited to the description of the preferred embodiments contained herein.

We claim:

1. A moving media storage apparatus comprising:

a spindle motor having a first pole;

a spindle driver for generating a spindle motor driving signal, said spindle driver including a first MOSFET having a first drain connected to a power supply, a first source connected to said first pole of said spindle motor, and a first body connected to ground, said first source and said first body not being shorted together;

a voice-coil motor; and a head actuator for driving said voice-coil motor, said first pole of said spindle motor being connected via a diode to said head actuator.

2. The apparatus according to claim 1 further comprising a capacitor having a first terminal connected to a cathode of said diode.

3. The apparatus according to claim 2 further comprising a zener diode connected in parallel with said capacitor.

4. The apparatus according to claim 1 wherein said first MOSFET is an n-channel MOSFET.

5. The apparatus according to claim 1 further comprising a Schottky diode connected between said power supply and said head actuator.

6. The apparatus according to claim 1, wherein said head actuator comprises a head retract circuit for sensing a reduction in a voltage supplied by said power supply.

7. The apparatus according to claim 1 wherein said spindle driver includes first, second and third MOSFETs and said spindle motor has first, second and third poles, said poles being connected via first, second and third diodes, respectively, to said head actuator.

8. The apparatus of claim 1 wherein said head actuator comprises:

a first bipolar transistor connected between a first pole of said voice-coil motor and said diode and a second bipolar transistor connected between a second pole of said voice-coil motor and ground; and a head-retract circuit, connected to a base of said first bipolar transistor and a base of said second bipolar transistor.

9. The apparatus of claim 8 further comprising:

a capacitor having a first terminal connected to a cathode of said diode; and a grounded zener diode connected in parallel with said capacitor.

10. The apparatus of claim 9 wherein said head actuator further comprises:

a head-control circuit.;

a second MOSFET having a second drain connected to said power supply, a second source connected to said first pole of said voice-coil motor, a second body connected to ground, and a second gate connected to said head-control circuit, said second body not being shorted to said second source;

a third MOSFET having a third drain connected to said power supply, a third source connected to said second pole of a voice-coil motor, and a third body connected to said head-control circuit, said third body not being shorted to said third source.

11. The apparatus of claim 10 further comprising a parallel combination of a fourth MOSFET and a diode, said parallel combination being connected between said power supply and said head actuator.

12. A moving media storage apparatus connected to a power supply, said apparatus comprising:

a spindle motor;

a voice-coil motor having a first pole and a second pole;

a spindle driver connected to said spindle motor; and a head actuator comprising:

a head control circuit, a first MOSFET having a first drain connected to said power supply, a first source connected to said first pole of said voice-coil motor, a first body connected to ground, and a first gate connected to said head control circuit, said first source not being shorted to said first body, a second MOSFET having a second drain connected to said power supply, a second source connected to said second pole of said voice-coil motor, a second body connected to ground, and a second gate connected to said head control circuit, said second source not being shorted to said second body, and an auxiliary voltage line, said first pole being connected to said auxiliary voltage line through a first diode, and said second pole being connected to said auxiliary voltage line through a second diode.

13. The apparatus of claim 12 further comprising:

a head-retract circuit; and a push-pull halfbridge comprising:

a first bipolar transistor connected between said auxiliary voltage line and said first pole of said voice-coil motor and having a first base connected to said head-retract circuit; and a second bipolar transistor connected between said second pole of said voice-coil motor and ground and having a second base connected to said head-retract circuit.

14. The apparatus of claim 13 further comprising: a capacitor having a first terminal connected to said auxiliary voltage line and a second terminal connected to ground.

15. The apparatus of claim 14 wherein said spindle motor comprises a third pole, said spindle driver comprises a third MOSFET having a drain connected to said power supply, a third source connected to said third pole, and a third body connected to ground, said third source not being shorted to said third body, said third pole being connected to said auxiliary voltage line through a third diode.

16. The apparatus of claim 14 further comprising a zener diode connected in parallel with said capacitor.

17. The apparatus according to claim 13 wherein the second bipolar transistor is an NPN bipolar transistor and said first bipolar transistor is a PNP bipolar transistor.

18. The apparatus of claim 12 further comprising a parallel combination of a third MOSFET and a third diode, said parallel combination being connected between said power supply and said auxiliary voltage line.

19. The apparatus of claim 18 wherein a body of said third MOSFET is not shorted to a source of said third MOSFET.

* * * * *